United States Patent [19]
Stenzel

[11] Patent Number: 5,664,840
[45] Date of Patent: Sep. 9, 1997

[54] HEADREST FOR MOTOR-VEHICLE SEAT

[75] Inventor: Wolfgang Stenzel, Einbeck, Germany

[73] Assignee: R. Schmidt GmbH, Lennestadt, Germany

[21] Appl. No.: 753,336

[22] Filed: Nov. 22, 1996

[30] Foreign Application Priority Data

Dec. 23, 1995 [DE] Germany ............... 295 20 526.1

[51] Int. Cl.⁶ .................................................. A47C 7/36
[52] U.S. Cl. .................................. 297/391; 297/220
[58] Field of Search ................ 297/391, 408–410, 297/405, 220, 440.11, 440.1, 463.1, 463.2, 452.65, 218.5, 218.3, 218.1, 218.2

[56] References Cited

U.S. PATENT DOCUMENTS

| | | | |
|---|---|---|---|
| 1,234,571 | 7/1917 | Robideau | 297/391 X |
| 3,437,374 | 4/1969 | Bennett | 297/391 |
| 3,719,388 | 3/1973 | Fortnam | 297/405 |
| 5,139,310 | 8/1992 | Itoh | 297/391 |
| 5,257,853 | 11/1993 | Elton et al. | 297/391 |
| 5,328,244 | 7/1994 | Ishihara et al. | 297/391 |
| 5,405,190 | 4/1995 | Jeffcoat et al. | 297/391 |

FOREIGN PATENT DOCUMENTS 43 37 145  11/1994  Germany.

*Primary Examiner*—Milton Nelson, Jr.
*Attorney, Agent, or Firm*—Herbert Dubno; Andrew Wilford

[57] ABSTRACT

A motor-vehicle headrest has a hollow housing having a front face and a back face, at least one mounting rod seated in the housing and adapted to be secured to a motor-vehicle seat back, and a body of soft cushion material on the front housing face. The back face is formed with a peripheral backwardly open groove and is substantially free of cushioning. A flexible cover sheet overlies the cushion body and has an outer edge engaged in the groove. A stiff rear cover has a forwardly directed rim tightly fitted in the groove and retains the cover edge therein. The housing is formed of a pair of joined-together cup-shaped parts. The groove is formed with teeth engaging and holding the cover-sheet edge.

3 Claims, 1 Drawing Sheet

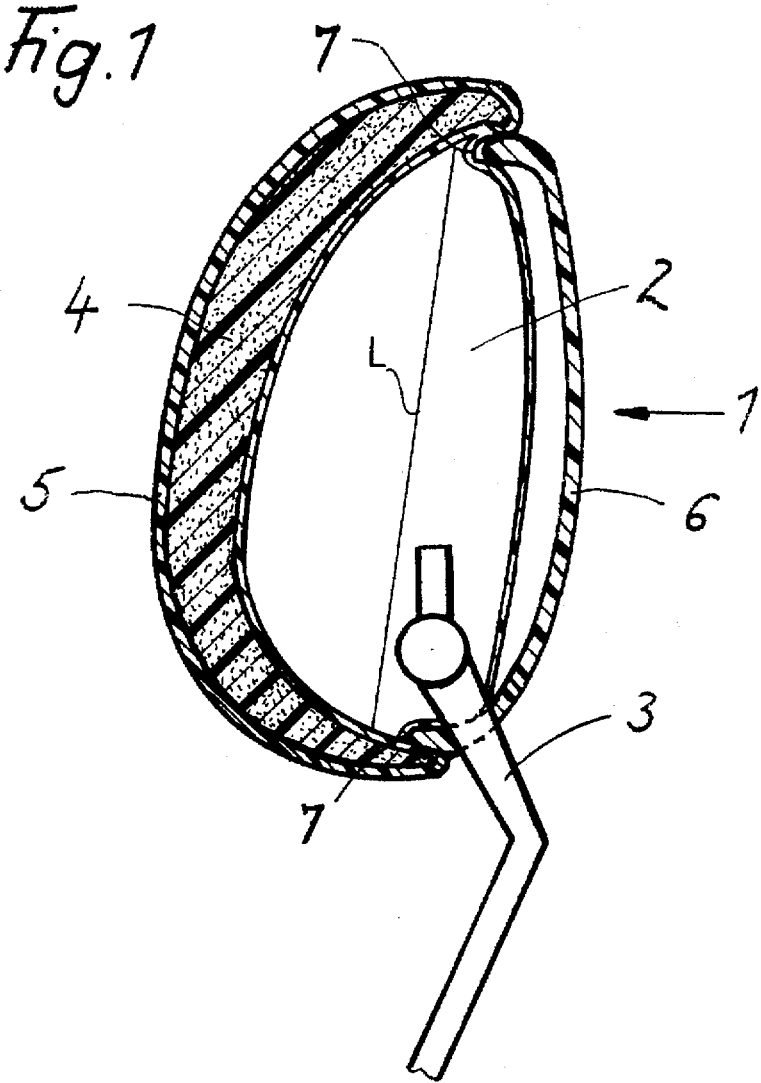
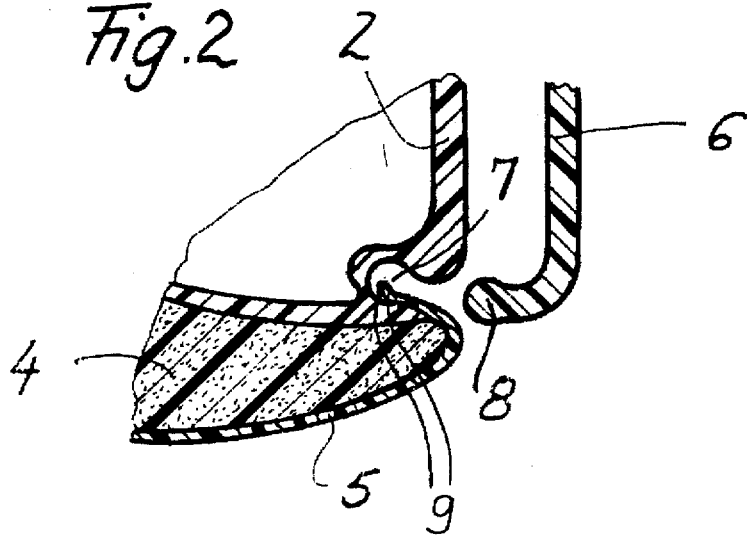

HEADREST FOR MOTOR-VEHICLE SEAT

FIELD OF THE INVENTION

The present invention relates to a headrest for a motor-vehicle seat. More particularly this invention concerns such a headrest which is cushioned.

BACKGROUND OF THE INVENTION

As described in German patent document 4,337,145 a standard motor-vehicle headrest has a hollow housing having a front face and a back face, at least one mounting rod seated in the housing and adapted to be secured to a motor-vehicle seat back, and bodies of soft cushion material on the housing faces.

Normally the two cushions are fitted and glued to the housing core. Then a fitted textile cover is slipped over the assembly and stitched up to complete the headrest. This entire assembly is fairly complex and, therefore, adds considerably to the manufacturing costs of such a headrest.

OBJECTS OF THE INVENTION

It is therefore an object of the present invention to provide an improved motor-vehicle headrest.

Another object is the provision of such an improved motor-vehicle headrest which overcomes the above-given disadvantages, that is which is of simple and inexpensive construction.

SUMMARY OF THE INVENTION

A motor-vehicle headrest has according to the invention a hollow housing having a front face and a back face, at least one mounting rod seated in the housing and adapted to be secured to a motor-vehicle seat back, and a body of soft cushion material on the front housing face. The back face is formed with a peripheral backwardly open groove and is free of cushioning. A flexible cover sheet overlies the cushion body and has an outer edge engaged in the groove. A stiff rear cover has a forwardly directed rim tightly fitted in the groove and retains the cover edge therein.

Thus according to the invention the cushioning on the rear face of the headrest, where it really serves no function, is replaced by a stiff cover that, while being decorative, serves to retain the cover sheet in place. In turn the cover sheet holds the front cushion in place, as same is not otherwise attached to the housing. Thus the headrest is of extremely simple construction but is as functional as the more expensively made prior-art systems.

According to the invention the housing is formed of a pair of joined-together cup-shaped parts. The groove is formed with teeth engaging and holding the cover-sheet edge.

BRIEF DESCRIPTION OF THE DRAWING

The above and other objects, features, and advantages will become more readily apparent from the following description, reference being made to the accompanying drawing in which:

FIG. 1 is a vertical section through the headrest according to the invention; and FIG. 2 is a large-scale view of a detail of FIG. 1.

SPECIFIC DESCRIPTION

As seen in FIG. 1 a headrest 1 according to this invention comprises a hollow and basically rigid housing 2 made of two cup-shaped parts joined together at a line L and having a front face directed to the left in FIG. 1 and a back face directed toward the right. Rods 3 (one shown) are seated in the housing 2 and have lower ends normally engaged in a seat back.

The front face of the housing 2 is covered with a body 4 of sponge-rubber cushioning material while the back face has no such cushioning. A flexible textile sheet 5 is engaged over the cushion 4 to hold it in place and has an outer edge received in a backwardly open annular groove 7 formed along the outer edge of the back face of the body 2.

A rigid rear cover 6 made of plastic has a beaded rim 8 that fits tightly in the complementarily shaped groove 7 to retain the cover 6 in place on the back face of the housing 2 and to retain the edge of the front cover sheet 5 in place therein. Teeth 9 formed in the groove 2 serve to retain the sheet 5 in place in the groove 7.

I claim:

1. A motor-vehicle headrest comprising:
   a hollow housing having a front face and a back face, the back face being formed with a peripheral backwardly open groove;
   at least one mounting rod seated in the housing and adapted to be secured to a motor-vehicle seat back;
   a body of soft cushion material on the front housing face, the back housing face being substantially free of cushioning;
   a flexible cover sheet overlying the cushion body and having an outer edge engaged in the groove; and
   a stiff rear cover having a forwardly directed rim tightly fitted in the groove and retaining the cover edge therein.

2. The motor-vehicle headrest defined in claim 1 wherein the housing is formed of a pair of joined-together cup-shaped parts.

3. The motor-vehicle headrest defined in claim 1 wherein the groove is formed with teeth engaging and holding the cover-sheet edge.

* * * * *